United States Patent
Makaran

(10) Patent No.: US 6,888,328 B2
(45) Date of Patent: May 3, 2005

(54) QUASI BIPOLAR TOPOLOGY FOR BRUSHLESS MOTORS

(75) Inventor: John Makaran, Ontario (CA)

(73) Assignee: Siemens VDO Automotive Inc., Mississauga (CA)

( * ) Notice: Subject to any disclaimer, the term of this patent is extended or adjusted under 35 U.S.C. 154(b) by 226 days.

(21) Appl. No.: 10/225,840

(22) Filed: Aug. 22, 2002

(65) Prior Publication Data

US 2003/0062862 A1 Apr. 3, 2003

Related U.S. Application Data

(60) Provisional application No. 60/315,998, filed on Aug. 31, 2001.

(51) Int. Cl.[7] .................................................. H02P 6/02
(52) U.S. Cl. ........................ 318/254; 318/138; 318/439
(58) Field of Search ................................ 318/254, 138, 318/439

(56) References Cited

U.S. PATENT DOCUMENTS

| | | | | |
|---|---|---|---|---|
| 3,720,865 A | * | 3/1973 | Bregeault | 318/138 |
| 4,467,407 A | * | 8/1984 | Asano et al. | 363/43 |
| 4,603,287 A | * | 7/1986 | Setoya | 318/696 |
| 4,607,204 A | * | 8/1986 | Setoya | 318/696 |
| 4,730,242 A | * | 3/1988 | Divan | 363/37 |
| 5,194,796 A | * | 3/1993 | Domeki et al. | 318/696 |
| 5,883,483 A | * | 3/1999 | Nagata et al. | 318/696 |
| 5,917,295 A | * | 6/1999 | Mongeau | 318/254 |
| 6,124,688 A | * | 9/2000 | Coles et al. | 318/254 |
| 6,331,757 B1 | * | 12/2001 | Makaran | 318/254 |

* cited by examiner

Primary Examiner—Rita Leykin

(57) ABSTRACT

A circuit 100 for a five phase DC brushless motor includes a first coil A and a first primary switch S1 for controlling current through the first coil; a second coil B and a second primary switch S3 for controlling current through the second coil; a third coil C and a third primary switch S5 for controlling current through the third coil; a fourth coil D and a fourth primary switch S7 for controlling current through the fourth coil; a fifth coil E and a fifth primary switch S9 for controlling current through the fifth coil. The first coil A is arranged to have a polarity of back EMF opposite of that of the third coil C; the second coil B is arranged to have a polarity of back EMF opposite of that of the fourth coil D; the third coil C is arranged to have a polarity of back EMF opposite of that of the fifth coil E, the fourth coil D is arranged to have a polarity of back EMF opposite of that of the first coil A; and the fifth coil E is arranged to have a polarity of back EMF opposite of that of the second coil B. The circuit further includes a first freewheeling current conducting switch S2 and a diode A between the first coil and the third coil; a second freewheeling current conducting switch S4 and a diode between the second coil and the fourth coil; a third freewheeling current conducing switch S6 and a diode between the third coil and the fifth coil; a fourth freewheeling current conducting switch S8 and a diode between the fourth coil and the first coil, and a fifth freewheeling current conducting switch S10 and diode between the fifth coil and the second coil.

7 Claims, 3 Drawing Sheets

STATE TABLE

| STATE | 1 | 2 | 3 | 4 | 5 |
|---|---|---|---|---|---|
| S1 | PWM | OFF | OFF | OFF | PWM |
| S2 | ON | OFF | OFF | OFF | ON |
| S3 | PWM | PWM | OFF | OFF | OFF |
| S4 | ON | ON | OFF | OFF | OFF |
| S5 | OFF | PWM | PWM | OFF | OFF |
| S6 | OFF | ON | ON | OFF | OFF |
| S7 | OFF | OFF | PWM | PWM | OFF |
| S8 | OFF | OFF | ON | ON | OFF |
| S9 | OFF | OFF | OFF | PWM | PWM |
| S10 | OFF | OFF | OFF | ON | ON |

QUASI BIPOLAR TOPOLOGY FOR BRUSHLESS MOTORS

This application is based on U.S. Provisional Patent Application No. 60/315,998, filed on Aug. 31, 2001, and claims the benefit thereof for priority purposes.

FIELD OF THE INVENTION

The invention relates to a brushless motor and, more particularly, to a quasi-bipolar motor that operates in a unipolar mode, with the freewheeling path for the current being directed through a second phase with the opposite polarity of back EMF.

BACKGROUND OF THE INVENTION

Brushless or electronically commutated motors have long been used in industrial applications and are making an entrance into automotive applications. Common topologies used for such motors are 3 phase motors, both unipolar and bipolar. These topologies are well suited to lower power applications.

In the case of the three phase unipolar motor, one phase is switched on at any given time. As a result, 33% of the copper is utilized at any given time. Furthermore, one must deal with the use issue of the energy recovery during the "off" portion of the pulse width modulation. Inverter topologies such as the R-dump and C-dump effectively deal with the recovery of energy to the positive rail during the off portions of the pulse width modulation, while at the same time, prevent the conduction of the motor back EMF through the energy recovery apparatus.

In the case of a wye connected, three phase bipolar motor with 120 degree commutation, two phases are on at any given time. In a wye connected three phase motor the current flows through two series transistors and through the two series windings resulting in 66 percent copper utilization at any given time. Special energy recovery devices in this topology are not required as energy recovery is achieved through the inherent drain to source diodes in the inverter legs.

In both the three phase unipolar and bipolar case, without a special costly heatsinking arrangement, the maximum attainable motor power will be limited.

Accordingly, there is a need to increase the maximum power levels attainable and to make the most efficient use of the current in a brushless motor.

SUMMARY OF THE INVENTION

An object of the invention is to fulfill the need referred to above. In accordance with the principles of the present invention, this objective is achieved by providing a circuit for a five phase brushless motor. The circuit includes a first coil and a first primary switch for controlling current through the first coil; a second coil and a second primary switch for controlling current through the second coil; a third coil and a third primary switch for controlling current through the third coil; a fourth coil and a fourth primary switch for controlling current through the fourth coil; a fifth coil and a fifth primary switch for controlling current through the fifth coil. The first coil is arranged to have a polarity of back EMF opposite of that of the third coil; the second coil is arranged to have a polarity of back EMF opposite of that of the fourth coil; the third coil is arranged to have a polarity of back EMF opposite of that of the fifth coil, the fourth coil is arranged to have a polarity of back EMF opposite of that of the first coil; and the fifth coil is arranged to have a polarity of back EMF opposite of that of the second coil. The circuit further includes a first freewheeling current conducting switch and a diode between the first coil and the third coil; a second freewheeling current conducting switch and a diode between the second coil and the fourth coil; a third freewheeling current conducing switch and a diode between the third coil and the fifth coil; a fourth freewheeling current conducting switch and a diode between the fourth coil and the first coil, and a fifth freewheeling current conducting switch and diode between the fifth coil and the second coil.

In accordance with another aspect of the invention, a method is provided for operating a DC brushless motor having phases A through E, whereby phase A has a polarity of back EMF opposite of that of phase C; phase B has a polarity of back EMF opposite of that of phase D; phase C has a polarity of back EMF opposite of that of phase E, phase D has a polarity of back EMF opposite of that of phase A; and phase E has a polarity of back EMF opposite of that of phase B. The method provides a switching arrangement such that phase C is fed with current by a freewheeling phase A, phase D is fed with current by a freewheeling phase B, phase E is fed with current by a freewheeling phase C, phase A is fed with current by a freewheeling phase D, and phase B is fed with current by a freewheeling phase E. Positive torque is generated by the phase in which current is being freewheeled through.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

To increase the maximum power levels attainable and to make the most efficient use of the current and the system, a new topology for a brushless motor is described below.

It is well-known that using multiphase brushless motors, the Current may be divided by the number of active phases, decreasing the size of the switching elements and reducing the need for heat sinking. Four and five phase unipolar motors exist where there are two active phases at any given time. In the case of the unipolar motor, energy recovery schemes such as C dump and R dump have been proposed, as have energy recovery schemes using bipolar windings. C dump and R dump topologies have the prime disadvantage of employing extra passive components that can be large as motor power increases. In addition, the free wheeling current from active phases is returned to the positive rail.

In a wye connected, five phase bipolar topology, four of the five phases are on at any given time resulting 80 percent copper utilization. Once again current flows through two sets of series coils and there is no need for special energy recovery devices due to the inherent draw to source diodes in MOSFETS of the motor. In the case of the four and five phase bipolar motors, larger switching devices are required to conduct current to the motor phases.

To minimize this number of large switching devices a form of unipolar topology is proposed that will result in a higher copper utilization than a unipolar motor and do away with large passive devices associated with energy recovery. This topology is dubbed herein as the "quasi-bipolar" topology.

Figures 1, 2:
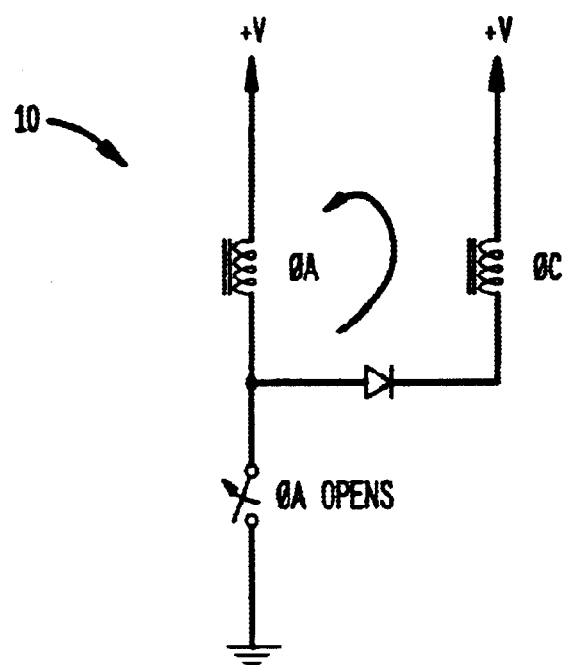
FIG. 1 is diagram of flux distribution of a four-phase motor.
FIG. 2 is a schematic diagram of a C-dump topology of two phases of a four phase motor whereby freewheeling current from phase A is returned to the positive voltage rail and flows through phase A.

To understand the operation of this switching topology, one must first understand the flux distribution in a four or five-phase motor by examining the phase back EMFs. In a four-phase motor the flux distribution is as shown in FIG. 1. As it may be seen, phases A and C are 180 degrees out of phase and phases B and D are also 180 degrees out of phase.

As shown in the circuit 10 of FIG. 2, if phase A is conducting in a normal unipolar motor and if, for example, a C dump topology is used, the freewheeling current from phase A is returned to the positive voltage rail and flows through phase A. Since phase C is 180 degrees from phase A, positive torque can also be generated by phase C by freewheeling phase A through it.

Figures 3, 4:
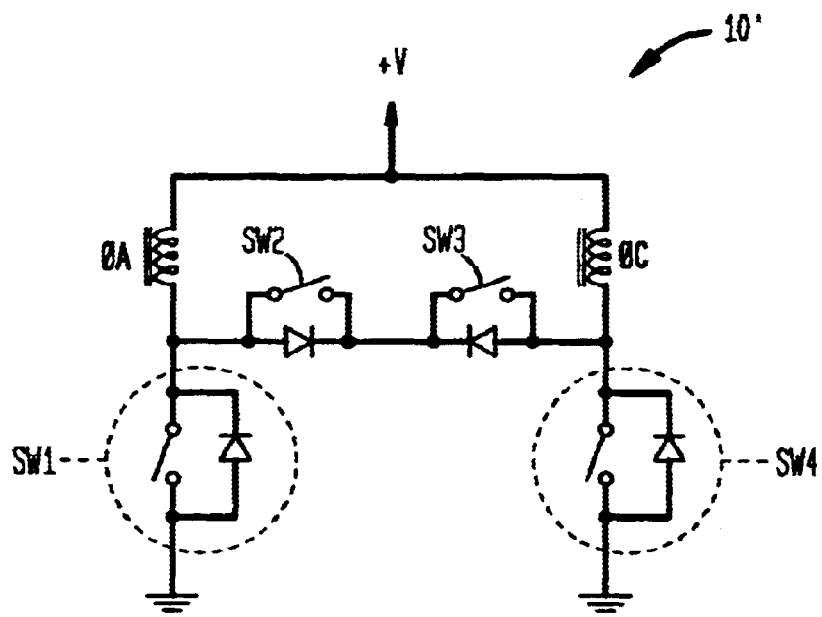
FIG. 3 is a schematic diagram showing linking of phases A and C by use of switches.
FIG. 4 is diagram of flux distribution of a five-phase motor.

In order to minimize the part count phases A and C may be linked in the manner shown in the circuit 10' of FIG. 3. Switch SW is linked to switch SW3 in the following manner:
Pulse Width Modulation (PWM) Mode:
 SW1 is closed, SW3 is open
 SW1 is opened, SW3 is closed.
Freewheeling Mode:
 SW1 is open, SW3 is open.
 Switch SW4 is linked to switch SW2 in a manner similar to that described above with regard to switches SW1 and SW3.

Another "cell" may be created in a similar fashion with phases B and D.

Figures 5, 6:
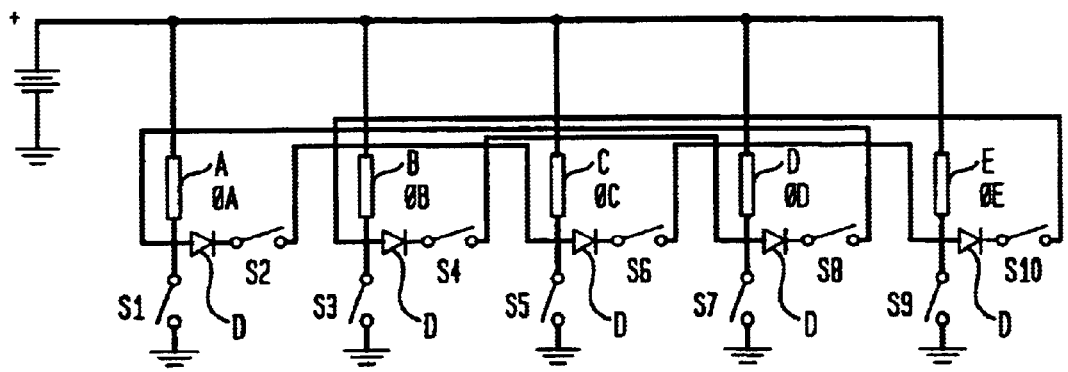
FIG. 5 is a schematic diagram showing a quasi-bipolar motor circuit in accordance with the invention.
FIG. 6 is a state table for the switches of FIG. 5.

For a five-phase motor, the phases are 72 electrical degrees apart and the flux distribution is as shown in FIG. 4. It follows that when phase A is positive, phase C is negative and so on. FIG. 5 shows a circuit 100 for a five phase quasi-bipolar motor in accordance with the invention.

In the five phase scheme, freewheeling phase A feeds phase C, freewheeling phase B feeds phase D, freewheeling phase C feeds phase E, freewheeling phase D feeds phase A and freewheeling phase E feeds phase B. As such, because the primary and free wheeling phases are not 180 degrees out of phase, a diode D (FIG. 5) must be added in series with the freewheeling switches, S2, S4, S6, S8 and S10. In FIG. 5, it can be appreciated that phases A–E correspond to coils A–E, respectively.

The state of the switches for operation of a motor is shown in the state table of FIG. 6. The switches described herein are preferably MOSFETs and the diodes D are preferably power diodes.

This topology offers several advantages over unipolar topology including: higher copper utilization, and no passive components for energy recovery.

This topology offers advantages over the bipolar topology including: lower power rated switching devices possible and lower RFI emissions. For example, with reference to FIG. 5, the switching devices for conducting the freewheeling current, namely freewheeling current conducting switches S2, S4, S6, S8 and S10 have a lower power rating than the primary phase switches S1, S3, S5, S7, and S9. This results in lower inverter power dissipation, improved electronics durability, and lower costs. With regard to lower RFI emissions, the freewheeling coil, while generating torque, will also act as a conducted RFI choke.

It can be appreciated that the topology described herein is applicable to any multiple phase motor where the EMF of a phase in the negative polarity is in opposition to the EMF of a phase in a positive polarity.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of operating a DC brushless motor having phases A through E, whereby phase A has a polarity of back EMF opposite of that of phase C; phase B has a polarity of back EMF opposite of that of phase D; phase C has a polarity of back EMF opposite of that of phase E, phase D has a polarity of back EMF opposite of that of phase A; and phase E has a polarity of back EMF opposite of that of phase B, the method including:
 providing a switching arrangement such that phase C is fed with current by a freewheeling phase A, phase D is fed with current by a freewheeling phase B, phase E is fed with current by a freewheeling phase C, phase A is fed with current by a freewheeling phase D, and phase B is fed with current by a freewheeling phase E,
 whereby positive torque is generated by the phase in which current is being freewheeled through.

2. The method of claim 1, wherein the step of providing a switching arrangement provides a switch between phases A and C, between phases B and D, between phases C and E, between phases D and A, and between phases E and B.

3. The method of claim 2, further providing a diode in series with each said switch.

4. A method of operating a DC brushless motor having multiple phases, whereby in operation, EMF of a phase in the negative polarity is in opposition to the EMF of a corresponding phase in a positive polarity, the method including:
 providing a switching arrangement such that a phase in the negative polarity is fed with current by a corresponding freewheeling phase in the positive polarity, thereby generating torque.

5. A circuit for a five phase DC brushless motor comprising:
 a first coil,
 a first primary switch for controlling current through the first coil,
 a second coil,
 a second primary switch for controlling current through the second coil,
 a third coil, a third primary switch for controlling current through the third coil, the a fourth coil, a fourth primary switch for controlling current through the fourth coil, a fifth coil, a fifth primary switch for controlling current through the fifth coil, whereby the first coil is arranged to have a polarity of back EMF opposite of that of the third coil; the second coil is arranged to have a polarity of back EMF opposite of that of the fourth coil; the third coil is arranged to have a polarity of back EMF opposite of that of the fifth coil, the fourth coil is arranged to have a polarity of back EMF opposite of that of the first coil; and the fifth coil is arranged to have a polarity of back EMF opposite of that of the second coil, a first freewheeling current conducting switch and a diode between the first coil and the third coil, a second freewheeling current conducting switch and a diode between the second coil and the fourth coil, a third freewheeling current conducing switch and a diode between the third coil and the fifth coil, a fourth freewheeling current conducting switch and a diode between the fourth coil and the first coil, and a fifth freewheeling current conducting switch and diode between the fifth coil and the second coil.

6. The circuit of claim 5, wherein the power rating of each said freewheeling current conducing switch is less than a power rating of each said primary switch.

7. The circuit of claim 5, wherein each of said primary switch and each said freewheeling current conducting switch is a MOSFET.

* * * * *